June 2, 1964   F. A. MILITANA   3,135,126
TRACK IDLER
Filed April 20, 1961

INVENTOR.
FRANK A. MILITANA
BY

United States Patent Office 3,135,126
Patented June 2, 1964

3,135,126
TRACK IDLER
Frank A. Militana, Westchester County, N.Y.
(550 Monterey Ave., Pelham Manor, N.Y.)
Filed Apr. 20, 1961, Ser. No. 104,405
11 Claims. (Cl. 74—230.05)

This invention relates to track idlers and more particularly to track idler rims to be replaced when worn.

It is an object of the present invention to provide a track idler with a track idler rim that can be replaced in a simple and efficient manner.

Another object of the present invention is to provide a replaceably rimmed track idler which can be readily used on any crawler-type tractor, crane, power shovel or the like.

Another object of the present invention is to provide a track idler that is attractive in appearance, and which will wear well under extreme ground conditions.

Still a further object of the present invention is to provide a track idler having a replaceable track idler rim which can be produced, packaged, and sold in large quantities at a comparatively low cost, and which can be conveniently utilized wherever needed.

Still additional objects, benefits, and advantages of this invention will become evident from a study of the following detailed description taken in conjunction with the accompanying drawing, in which.

Figure 1:
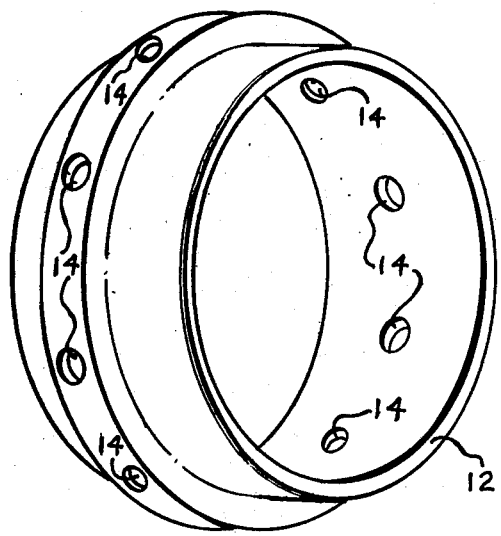
FIGURE 1 is a perspective view of a detachable track idler rim made in accordance with the present invention.
Figure 2:
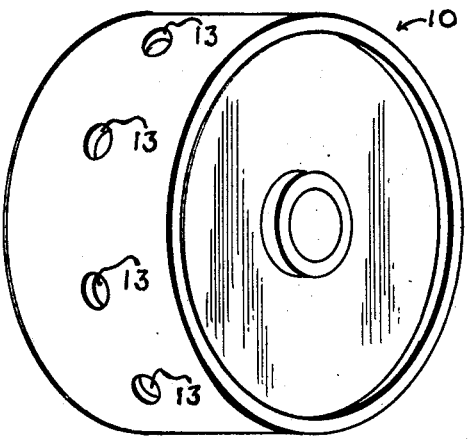
FIGURE 2 is a perspective view of the core of a track idler made in accordance with the present invention.
Figure 3:
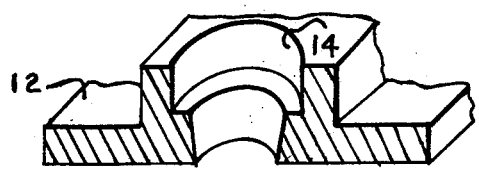
FIGURE 3 is a cross sectional view of the track idler rim.
Figure 4:
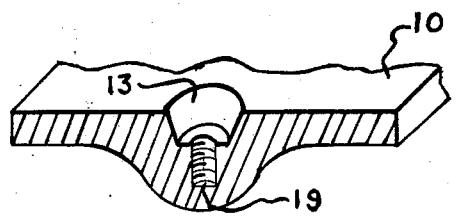
FIGURE 4 is a cross sectional view showing the outer edge of the track idler core.
Figure 5:
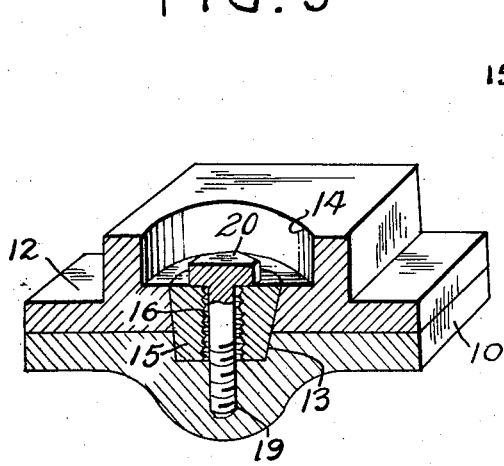
FIGURE 5 is a cross sectional view combining FIGURE 3, FIGURE 4 and FIGURE 6.
Figure 6:
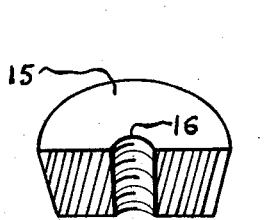
FIGURE 6 is a cross sectional view of a track idler rim locking plug.
Figure 7:
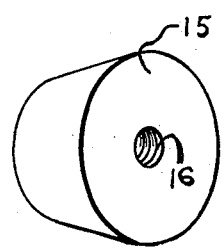
FIGURE 7 is a perspective view of a track idler rim locking plug made in accordance with the present invention.

Referring now specifically to the drawing, the all new track idler made in accordance with the present invention is shown to include locking plugs 15 to retain a track idler rim 12 on a track idler core 10. The straight, stepped and tapering holes 14 of track idler rim 12 and tapering holes 13 of the track idler core 10 will align with one another to receive tight taper fitting track idler rim locking plugs 15. Holes 16 of track idler rim locking plugs 15 and threaded holes 19 in the track idler core 10 will receive suitably sized cap screws 20 to retain track idler rim locking plugs 15 in a locked position as shown in FIGURE 5.

To simplify removal of the track idler rim locking plugs 15, the holes 16 in the track idler rim locking plugs 15 will be threaded to allow a suitable puller such as a slide hammer, or a cap screw with a flat washer larger than hole 14, or any other screw type puller that may be readily available.

The all new track idler constituting the core 10 and the track idler rim 12 including track idler rim locking plug 15 may be manufactured from any material suitably used in the production of track idlers.

The all new track idler which comprises the core 10 with tapering holes 13 and threaded holes 19 and which further includes the track idler rim 12 with straight, stepped and tapering holes 14 and also the track idler rim locking plugs 15, with threaded holes 16 may vary in size and shape to enable the same to be used in all types and sizes of machinery, crawler tractors, cranes, power shovels, or the like.

The all new track idler may be a disk, spoke, or any other type wheel used in the production of track idlers.

The tapering holes 13 with threaded holes 19 and the straight, stepped and tapering holes 14, including track idler rim locking plugs 15, may vary in number to permit their use in various sizes and types of machinery.

The operation of this device will now be readily understood. After the all new track idler including the track idler rim 12 has been in extensive use and is ready for replacement, to restore the said idler to a near new condition, simply unscrew all the cap screws 20 from the threaded holes 19 of the track idler core 10, and remove from holes 16 of the track idler rim locking plugs 15. Now remove the track idler rim locking plugs 15 from the tapering holes 13 and the straight, stepped and tapering holes 14 using a suitable puller. After all the track idler rim locking plugs 15 have been removed, the track idler rim 12 is now ready for removal by simply pushing it out either side of the track idler core 10. The track idler core 10 is now ready to receive a new track idler rim 12, by reversing the order of removal.

While this invention has been described with particular reference to the construction shown in the drawing and while various changes may be made in the detail construction, it shall be understood that such changes shall be within the spirit and scope of the present invention as defined by the appended claims.

Having thus completely and fully described the invention, what is now claimed as new and desired to be protected by Letters Patent of the United States is:

1. A rotary non-driven circular member for engaging an endless track of a crawler-type vehicle, said member comprising a removable unbroken continuous broad outer replaceable wear rim having a circular outer contour and a circular inner contour, said rim having a radial thickness that is small in comparison to its diameter and being provided with a plurality of openings in certain predetermined angular positions, a single circular core having a plurality of openings in the same certain angular predetermined relationship as the openings in the rim, said core further having a through central opening, the external circumferential surface of said core being matched to the internal surface of the rim so that the rim nestably fits the core, and a plurality of locking elements snugly and completely received in said openings and each element extending from an opening in the rim to an opening in the core to retain the rim on the core.

2. A member as set forth in claim 1 wherein the locking elements are wedge-shaped and wherein the openings are shaped to match the contour of the locking elements.

3. A member as set forth in claim 1 wherein the openings are radially orientated.

4. A rotary non-driven circular member for engaging an endless track of a crawler-type vehicle, said member comprising a removable unbroken continuous broad outer wear rim having a circular outer contour and a circular inner contour, said rim having a radial thickness that is small in comparison to its diameter and being provided with a plurality of openings in certain predetermined angular positions, a single circular core having a plurality of openings in the same certain angular predetermined relationship as the openings in the rim, said core further having a through central opening, the external circumferential surface of said core being matched to the internal surface of the rim so that the rim nestably fits the core, and a plurality of locking elements snugly and completely received in said openings and each element extending from an opening in the rim to an opening in the core to retain the rim on the core, the locking elements being plugs having through straight passageways therein, the openings being shaped to match the external contours of the plugs, the locking elements including screws having their heads resting against the outer ends of the plugs and their threaded shanks engaging tapped bores in the core.

5. A rotary non-driven circular member for engaging an endless track of a crawler-type vehicle, said member comprising a removable unbroken continuous broad outer wear rim having a circular outer contour and a circular inner contour, said rim having a radial thickness that is small in comparison to its diameter and being provided with a plurality of openings in certain predetermined angular positions, a single circular core having a plurality of openings in the same certain angular predetermined relationship as the openings in the rim, said core further having a through central opening, the external circumferential surface of said core being matched to the internal surface of the rim so that the rim nestably fits the core, and a plurality of locking elements snugly and completely received in said openings and each element extending from an opening in the rim to an opening in the core to retain the rim on the core, the locking elements being plugs having through straight passageways therein, the openings being shaped to match the external contours of the plugs, the locking elements including screws having their heads resting against the outer ends of the plugs and their threaded shanks extending through said passageways and engaging tapped bores in the core.

6. A member as set forth in claim 5 wherein the plugs are conical.

7. A rotary non-driven circular member for engaging an endless track of a crawler-type vehicle, said member comprising a removable unbroken continuous broad outer wear rim having a circular outer contour and a circular inner contour, said rim having a radial thickness that is small in comparison to its diameter and being provided with a plurality of openings in certain predetermined angular positions, a single circular core having a plurality of openings in the same certain angular predetermined relationship as the openings in the rim, said core further having a through central opening, the external circumferential surface of said core being matched to the internal surface of the rim so that the rim nestably fits the core, and a plurality of locking elements snugly and completely received in said openings and each element extending from an opening in the rim to an opening in the core to retain the rim on the core, the locking elements being plugs having through straight passageways therein, the openings being shaped to match the external contours of the plugs, the locking elements including screws having their heads resting against the outer ends of the plugs and their threaded shanks extending through said passageways and engaging tapped bores in the core, the openings in the rim being oversized to provide a stepped configuration at the heads of the screws.

8. A rotary non-driven circular member for engaging an endless track of a crawler-type vehicle, said member comprising a removable unbroken continuous broad outer wear rim having a circular outer contour and a circular inner contour, said rim having a radial thickness that is small in comparison to its diameter and being provided with a plurality of openings in certain predetermined angular positions, a single circular core having a plurality of openings in the same certain angular predetermined relationship as the openings in the rim, said core further having a through central opening, the external circumferential surface of said core being matched to the internal surface of the rim so that the rim nestably fits the core, and a plurality of locking elements snugly and completely received in said openings and each element extending from an opening in the rim to an opening in the core to retain the rim on the core, the locking elements being plugs having through straight passageways therein, the openings being shaped to match the external contours of the plugs, the locking elements including screws having their heads resting against the outer ends of the plugs and their threaded shanks extending through said passageways and engaging tapped bores in the core, the passageways in the plugs being tapped for reception of a plug puller.

9. A rotary non-driven circular member for engaging an endless track of a crawler-type vehicle, said member comprising a removable unbroken continuous broad outer replaceable wear rim part having a circular outer contour and a circular inner contour, said rim part having a radial thickness that is small in comparison to its diameter and being provided with a plurality of openings in certain predetermined angular positions, a single circular core part having a plurality of openings in the same certain angular predetermined relationship as the openings in the rim part, said core part further having a through central opening, the external circumferential surface of said core part being matched to the internal surface of the rim part so that the rim part nestably fits the core part, and a plurality of locking elements snugly and completely received in said openings and each element extending from an opening in the rim part to an opening in the core part and including separate means selectively operable to detachably engage one of said parts and to positively bear against said elements so as to detachably secure said elements to the rim part and to the core part thereby to removably retain the rim part on the core part.

10. A rotary non-driven circular member for engaging an endless track of a crawler-type vehicle, said member comprising a removable unbroken continuous broad outer replaceable wear rim part having a circular outer contour and a circular inner contour, said rim part having a flange, said rim part further having a radial thickness that is small in comparison to its diameter and being provided with a plurality of openings in certain predetermined angular positions, a single circular core part having a plurality of openings in the same certain angular predetermined relationship as the openings in the rim part, said core part further having a through central opening, the external circumferential surface of said core part being matched to the internal surface of the rim part so that the rim part nestably fits the core part, and a plurality of locking elements snugly received in said openings and each element extending from an opening in the rim part to an opening in the core part so as to detachably secure the rim part to the core part thereby to removably retain the rim part on the core part.

11. A rotary non-driven circular member for engaging an endless track of a crawler type vehicle, said member comprising a removable unbroken continuous broad outer replaceable wear rim part having a circular outer contour and a circular inner contour, said rim part having a flange, said rim part further having a radial thickness that is small in comparison to its diameter, a single circular core part having a through central opening, the external circumferential surface of said core part being matched to the internal surface of the rim part so that the rim part nestably fits the core part, and fastening means so as to detachably secure the rim part to the core part thereby to removably retain the rim part on the core part.

References Cited in the file of this patent

UNITED STATES PATENTS

| | | |
|---|---|---|
| 790,210 | Knox | May 16, 1905 |
| 953,506 | Baum | Mar. 29, 1910 |
| 2,372,716 | Evans | Apr. 3, 1945 |
| 2,618,495 | Maurey | Nov. 18, 1952 |
| 2,652,297 | Stearns et al. | Sept. 15, 1953 |